United States Patent [19]
Emma et al.

[11] Patent Number: 5,276,882
[45] Date of Patent: Jan. 4, 1994

[54] SUBROUTINE RETURN THROUGH BRANCH HISTORY TABLE

[75] Inventors: Philip G. Emma, Danbury, Conn.; Joshua W. Knight, Mohegan Lake; James H. Pomerene, Chappaqua; Rudolph N. Rechtschaffen, Scarsdale, all of N.Y.; Frank J. Sparacio, Sarasota, Fla.; Charles F. Webb, Poughkeepsie, N.Y.

[73] Assignee: International Business Machines Corp., Armonk, N.Y.

[21] Appl. No.: 558,998

[22] Filed: Jul. 27, 1990

[51] Int. Cl.⁵ .......................... G06F 9/42; G06F 9/38
[52] U.S. Cl. .............. 395/700; 364/DIG. 2; 364/938; 364/964.24; 364/964.25
[58] Field of Search ......................... 395/700

[56] References Cited

U.S. PATENT DOCUMENTS

| | | |
|---|---|---|
| 4,348,721 | 9/1982 | Brereton et al. |
| 4,430,706 | 2/1984 | Sand . |
| 4,586,127 | 4/1986 | Horvath . |
| 4,763,245 | 8/1988 | Emma et al. ............ 364/200 |
| 4,853,840 | 8/1989 | Shibuya .................. 364/200 |
| 4,858,104 | 8/1989 | Matsuo et al. .......... 364/200 |
| 4,984,154 | 1/1991 | Hanatani et al. ....... 364/200 |
| 4,991,080 | 2/1991 | Emma et al. ............ 364/200 |

OTHER PUBLICATIONS

J. Losq, "Subroutine Return Address Stack", Dec. 1981, IBM, TDB, vol. 24, No. 7A, pp. 3255-3258.
IBM Technical Disclosure Bulletin vol. 28, No. 10 Mar. 1986 "Highly Accurate Subroutine Stack Prediction Mechanism" pp. 4635-4637.
IBM Technical Disclosure Bulletin, vol. 30 No. 11 Apr. 1988 "Subroutine Call/Return Stack" pp. 221-225.

Primary Examiner—Gareth D. Shaw
Assistant Examiner—A. Katbab
Attorney, Agent, or Firm—Perman & Green

[57] ABSTRACT

Method and apparatus for correctly predicting an outcome of a branch instruction in a system of the type that includes a Branch History Table (BHT) and branch instructions that implement non-explicit subroutine calls and returns. Entries in the BHT have two additional stage fields including a CALL field to indicate that the branch entry corresponds to a branch that may implement a subroutine call and a PSEUDO field. The PSEUDO field represents linkage information and creates a link between a subroutine entry and a subroutine return. A target address of a successful branch instruction is used to search the BHT. The branch is known to be a subroutine return if a target quadword contains an entry prior to a target halfword that has the CALL field set. The entry with the CALL bit set is thus known to be the corresponding subroutine call, and the entry point to the subroutine is given by the target address stored within the entry. A PSEUDO entry is inserted into the BHT at the location corresponding to the entry point of the subroutine, the PSEUDO entry being designated as such by having the PSEUDO field asserted. The PSEUDO entry contains the address of the returning branch instruction in place of the target address field.

5 Claims, 3 Drawing Sheets

SUBROUTINE RETURN THROUGH BRANCH HISTORY TABLE

FIELD OF THE INVENTION

This invention relates generally to digital data processing apparatus and, in particular, to method and apparatus for predicting a target address of Branch on Condition Register (BCR)-type instructions that implement subroutine returns.

BACKGROUND OF THE INVENTION

Instruction flow in a digital data processor typically requires that instructions are fetched and decoded from sequential locations in a memory. A branch instruction is an instruction that causes a disruption in this flow, e.g., a taken branch causes decoding to be discontinued along the sequential path, and resumed starting at a new location in memory. The new location in memory may be referred to as a target address of the branch. Such an interruption in pipelined instruction flow results in a substantial degradation in pipeline performance.

One type of branch instruction is known as an unconditional branch in that it unconditionally transfers control from the branch instruction (BR) to the target instruction (TARG). That is, at the time that the branch instruction is decoded, it is known that the transfer of control to TARG will take place. A more costly, in terms of performance, branch instruction is known as a conditional branch (BC). This instruction specifies that control is to be transferred to TARG only if some condition, as determined by the outcome of a previous instruction, is met.

If it can be determined at instruction decode time that a conditional branch instruction will not be taken then there is no penalty associated with the execution of the conditional branch instruction. That is, the next sequential instruction may be decoded immediately following the decode of the branch instruction. If it is determined that the branch will be taken, a multi-cycle penalty associated with the branch is still incurred in that the target address must be generated and the target instruction must be fetched.

Several conditional branch prediction mechanisms are known in the art. Mechanisms that attempt to predict the outcomes of conditional branches at instruction decode time are known as decode-time prediction mechanisms. One particular type of decode-time predictor is referred to the "Decode History Table" (DHT) as described in U.S. Pat. No. 4,477,872 and in U.S. Pat. No. 4,430,706.

The DHT is a table of entries where an entry is accessed based on a transformation, such as a hash or truncation transformation, on the bits that define the address of a branch instruction. The entry itself comprises a single bit and is set if the corresponding branch instruction was taken the last time that it was executed, otherwise the bit is not set. If the DHT entry is set for a particular branch then the target address is generated and the target instruction fetched and decoded. If the DHT entry is not set the next-sequential instruction is decoded on a cycle following the decode of the branch instruction.

Another type of mechanism, known as a prefetch-time prediction mechanism, attempts to anticipate taken branches and to fetch target instructions prior to the time that the branch instructions are decoded. The prefetch-time prediction mechanism is incorporated into an instruction prefetch engine and redirects instruction prefetching down a branch-target path immediately following the prefetch of a predicted taken branch. By so doing, the prefetch-time mechanism ensures that an instruction buffer contains the branch target instruction at the time that the branch instruction is decoded, thereby allowing the branch target instruction to be decoded immediately following the decode of the branch instruction. As a result, a prefetch-time mechanism eliminates all branch instruction related time penalties when it predicts correctly.

Prefetch-time prediction mechanisms typically are variations on the Branch History Table (BHT), as first described in U.S. Pat. No. 3,559,183. The BHT is the prefetch-time analog of the Decode History Table. That is, the BHT is a table of entries that is accessed based on a transformation, hash or truncation, on the bits that define the address of the block of instructions that is being prefetched. The entry itself is more complex than a DHT entry in that the BHT operates "blindly" at prefetch time. That is, the BHT fetches blocks of instructions without the benefit of examining the content of the blocks. Thus, a BHT entry must be able to identify that an associated block of instructions contains a taken branch, based on a taken branch having been previously encountered within the block of instructions. Furthermore, it must be able to identify where, within the block, the taken branch instructions reside, since the particular branch instruction may not be relevant to current instruction fetching, depending on where the block is entered. Finally, the entry must specify the branch target address, so that prefetching can be immediately redirected down the target path should the particular branch be relevant to the current prefetch activity.

When the processor encounters a branch instruction that is found to be taken, it creates a BHT entry based on the address of the branch, the entry itself containing the branch target address. If the particular section of instructions containing the branch is ever reencountered, the BHT entry causes prefetching to be redirected at the time the branch instruction is prefetched. When the BHT redirects prefetching, it also enqueues information regarding this action, such as the address at which it "believes" there is a taken branch and the target address of the branch. In the case where the BHT correctly anticipated the branch, there is no penalty associated with the branch.

Branch instructions within a program that cause control to be transferred to a subroutine are referred to as subroutine call instructions. The branch instruction within the subroutine that transfers control back to the calling procedure is referred to as a subroutine return instruction. A subroutine may call other subroutines, resulting in what is known as nested subroutine calling. In some instruction set architectures subroutine call and return instructions are explicit. That is, all subroutine calls are implemented with a CALL instruction and all subroutine returns are implemented with a RETURN instruction.

When CALL and RETURN are explicit instructions, subroutine returns are readily handled with a stack. A stack is employed to handle subroutine returns in U.S. Pat. No. 4,586,127 and in U.S. Pat. No. 4,348,721. The general technique taught by this prior art is as follows: for each call instruction, push the return address onto the stack, and for each return instruction, pop the stack and use the contents as the return address. However, there is no branch prediction involved. In fact, in many processor architectures in which CALL and RETURN are explicit, the instructions are defined to operate through a stack.

In other instruction set architectures subroutine call and return instructions are not explicit, but are instead implemented with general branch instructions. In this case there is significant difficulty in determining which of the branch instructions are calls, and which are returns. The following articles propose methods to infer which of the branch instructions may be calls and returns based on the types of instructions that surround the branch instructions.

J. Losq in an article entitled "Subroutine Return Address Stack", IBM Technical Disclosure Bulletin, Vol. 24, No. 7a, December 1981 teaches a single stack that operates in conjunction with a Branch History Table. The return points of all potential calling instructions are pushed onto the stack, and the stack is popped in the event of every potential returning instruction. Losq recognizes and states that not every potential calling instruction is a subroutine call, and not every potential returning instruction is a subroutine return, resulting in irrelevant information being pushed onto the stack.

P. G. Emma et al. in an article entitled "Highly Accurate Subroutine Stack Prediction Mechanism" IBM Technical Disclosure Bulletin, Vol. 28, No. 10, March 1986 teach an increased accuracy of prediction achieved through a greater hesitancy to predict. This is accomplished by inhibiting the prediction based on intervening sequences of Load Multiple (LM) and Store Multiple (SM) instructions, and purging the stack in the event of a Load Program Status Word (LPSW) instruction.

In both of the foregoing articles a stack is maintained for all potential call instructions and is employed to predict a possible return instruction under a restrictive set of circumstances.

C. F. Webb, in an article entitled "Subroutine Call/Return Stack", IBM Technical Disclosure Bulletin, Vol. 30, No. 11, April 1988 also discusses the use of stacks in conjunction with a Branch History Table.

It is thus an object of the invention to provide a Branch History Table that does not require external stacks, wherein linkage information is managed directly by the Branch History Table.

SUMMARY OF THE INVENTION

The foregoing and other problems are resolved and the object of the invention is realized by apparatus and method for predicting outcomes of branch instructions. In a presently preferred embodiment apparatus is disclosed that includes a history-based prediction mechanism having storage for entries descriptive of previously executed branch instructions, including subroutine return points. The apparatus further includes a mechanism for identifying those branch instructions that implement subroutine calls and those branch instructions that implement subroutine returns. The apparatus further includes a mechanism, responsive to the operation of the identifying mechanism, for replacing a historical subroutine return point with a future subroutine return point, the future subroutine return point being determined from a current subroutine call point.

A presently preferred embodiment of the invention, that does not require a stack or stacks, is described wherein linkage information is managed directly by the Branch History Table.

In accordance with a preferred embodiment of the invention there is provided a method and apparatus for predicting subroutine returns that is more reliable than prior techniques and which furthermore does not require supplemental hardware structures, given that a BHT is present. The invention operates with non-explicit subroutine call and return instructions BALR (Branch and Link Register) and BCR (Branch on Condition to Register). The technique of the invention achieves a higher reliability by positively identifying a returning BCR with the entry point of the corresponding subroutine, thereby eliminating the confusion associated with identifying the calling and returning branches.

The technique requires only that entries in the BHT have two additional tag fields, each being only a single bit in length, and eliminates a requirement for stacks and other logic. These tag fields include:

(1) CALL—a field to indicate that the current branch entry corresponds to a BAL or to a BALR, and (2) PSEUDO—a field to indicate that the associated entry does not correspond to a branch, but rather is a "pseudo entry".

Only when an entry that corresponds to a BAL or BALR is made in the BHT is the CALL bit for the entry set. A target address of a successful branch instruction is used to search the BHT, and the branch is known to be a subroutine return if a target quadword contains an entry prior to the target halfword that has the CALL bit set. In this event, the entry with the CALL bit set is known to be the corresponding subroutine call, and the entry point to the subroutine is given by the target address stored with this BHT entry. A pseudo entry is inserted into the BHT at the location corresponding to the entry point of the subroutine, the pseudo entry being designated as such by having the PSEUDO field bit set or asserted. The pseudo entry also contains the address of the returning branch instruction in place of the target address field. This pseudo entry represents linkage information and functions to create a link between a subroutine entry and the corresponding subroutine return.

If a BHT search, done in response to a target address to a taken BAL or BALR, reveals a PSEUDO entry, a BHT update is accomplished. The update is of a type having a target address change made to the entry specified in the target address field of the pseudo entry. The target address placed in the entry is the next sequential address to the BAL or BALR.

BRIEF DESCRIPTION OF THE DRAWING

These and other aspects of the invention are described in detail below and in conjunction with the attached Drawing wherein.

DETAILED DESCRIPTION OF A PREFERRED EMBODIMENT OF THE INVENTION

Figure 1:
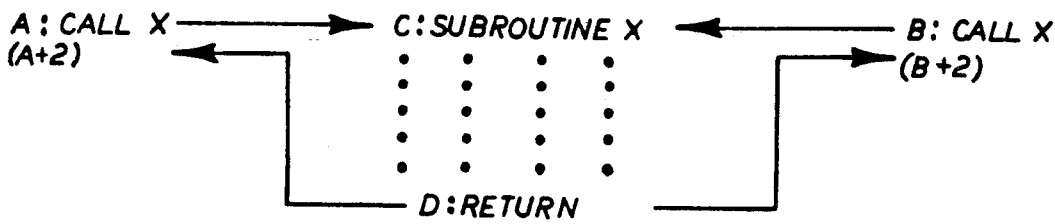
FIG. 1 illustrates a flow of control during the calling and return from a subroutine X that is called from two different locations.

FIG. 1 diagrammatically depicts the operation of subroutine call and return instructions. Specifically a subroutine X is located at a memory location C and is called at different times from instructions stored at memory locations A and B. The subroutine return instruction at memory location D should ideally return to the instruction following location A when X is called by A and should return to the location following location B when X is called by B. However, in a history based predictor, such as a Branch History Table, the returning branch at D may be correctly anticipated but control incorrectly returned to A when X is called by B, if A had last called X.

By example, in IBM 370 and compatible architectures instructions that are used to implement subroutine calls are variations on the BAL (Branch and Link) or BALR (Branch and Link Register) instructions. Instructions that are used to implement subroutine returns are a variation on the BCR (Branch on Condition to Register) instruction.

It is noted that, in a given group of computer instructions, not all BALR instructions are subroutine calls and not all BCR instructions are subroutine returns. It is further noted that the teaching of the invention is not to be construed to be limited to only these particular instruction types, or to be limited for practice only with a specific type of computer architecture, or only with architectures compatible with a specific architecture.

BALR is a two byte instruction having the form BALR R1,R2. This instruction, when located at an address A, causes upon execution A+2 to be loaded into R1 along with other information from the PSW (Program Status Word). If the R2 specifier is not zero a branch is taken to the address contained in R2. To conform to the example shown in FIG. 1 above R2 would contain the address C. When the BALR is executed R1 is loaded with the return point address A+2.

BCR is also a two byte instruction having the form BCR M1,R2. BCR employs a mask field M1 to determine whether the BCR is taken. If the determination is positive, then control is transferred to the address contained in R2. To conform to the example of FIG. 1 above BCR is the returning branch at location D and R2 contains the address A+2 or B+2.

Figure 2B:
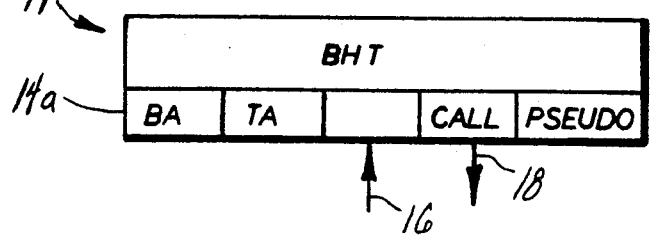
FIG. 2b illustrates the Branch History Table of a preferred embodiment of the invention.
Figure 2A:
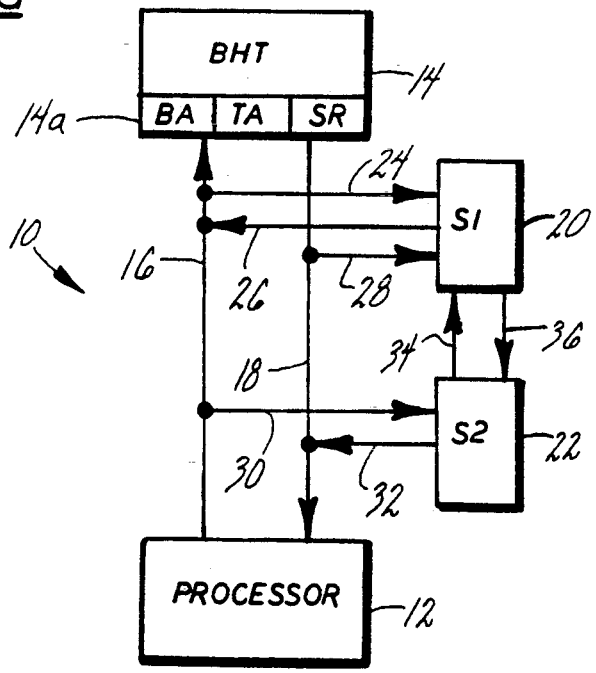
FIG. 2a a block diagram illustrating a Branch History Table that operates with two stacks.

A BHT that operates with two stacks is illustrated in block diagram form in FIG. 2a. A data processing system 10 includes a processor 12 that executes branches and stores branch information in a Branch History Table (BHT) 14 along a path 16. The BHT 14 employs historical information to predict future branches and provides these predictions to the processor 12 along a path 18. When a misprediction is discovered by the processor 12 the BHT 14 is updated along path 16. A BHT 14 entry 14a contains at least: 1) a taken Branch Address (BA) and 2) the Target Address (TA) to which the branch is taken.

The system 10 also includes a first stack (S1) 20, a second stack (S2) 22, a plurality of additional data paths 24, 26, 28, 30, 32, 34 and 36 and an additional storage bit in the BHT 14 entry 14a indicating that the associated entry is a Subroutine Return (SR). The SR bit being set indicates that the content of the TA field for the entry 14a is to be interpreted as described below.

The ensuing description of the operation of S1 20 and S2 22 uses the example presented above with respect to FIG. 1.

When a BALR instruction is executed at address A, the addresses A and C are sent to the BHT 14 along path 16 to create an entry with BA=A, and TA=C. The target address of the BALR, or C, the entry point into the subroutine, is pushed onto S1 20 on path 24 and the return point A+2 is pushed onto S2 22 on path 30.

When the BCR instruction is executed at address D with target address A+2 the addresses D and A+2 are sent to the BHT 14 along path 16, ostensibly to create an entry with BA=D, and TA=A+2. When this data is transmitted, the address A+2 is also sent to stack S2 22 along path 30 to determine whether S2 22 has an entry for address A+2. In this example S2 22 does have such an entry. The corresponding entry in S1 20, in this case the value C, is found via path 34 and sent along path 26 where it replaces the TA field on path 16. The entry that is stored in the BHT 14 thus has BA=D and TA=C. To indicate that this is not a "normal" entry the SR bit for the corresponding entry 14a is asserted.

When the BALR at address B is executed the addresses B and C are sent to the BHT 14 along path 16 to create an entry with BA=B, and TA=C. Also, the target address of the BALR or, C the entry point into the subroutine, is pushed onto S1 20 on path 24 and the return point B+2 is pushed onto S2 22 on path 30.

During the course of further instruction fetching the BHT 14 will find an entry for address D, the upcoming BCR, and that entry will have the SR bit asserted.

The prediction associated with the entry, having BA=D and TA=C as indicated above, is transmitted to path 18. In that the SR bit is asserted the TA field of the entry is also sent to S1 20 on path 28 to determine whether S1 20 has an entry with address C. In this case S1 20 does have such an entry and the corresponding entry in S2 22, in this case the value of the corresponding entry is B+2, is identified via path 36 and is placed on path 32 where it replaces the TA field on path 18.

The prediction that is received by the processor 12 from path 18 thus has BA=D and TA=B+2. That is, the prediction received by processor 12 is that there is a branch at address D whose target address is B +2. As a result the dual stack system of FIG. 2 provides the correct target address B+2 instead of the historical target address A+2.

Next there is described a presently preferred embodiment of the invention that does not employ stacks. As such, for the ensuing description only the processor 12, BHT 14 and data paths 16 and 18 of FIG. 2a are required, in addition to the modifications to the BHT 14 as described below and as shown in FIG. 2b.

As was previously explained the instruction fetching mechanism fetches "blocks" of instructions. As such, the instruction fetching mechanism has no notion of "instructions", rather, it is an autonomous device that causes the transfer of blocks of contiguous bytes from the cache to an instruction buffer. Consequently, a prefetch-time prediction mechanism such as a BHT operates on blocks of instructions and not on the individual instruction addresses. Since a block of instructions may contain more than one taken branch, the prefetch-time prediction mechanism is made set-associative so that multiple branch entries may be stored for a given block of instructions.

Figure 3:
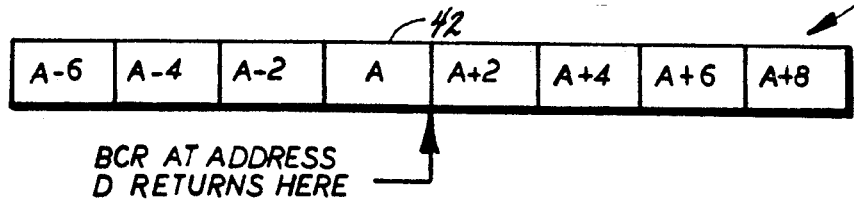
FIG. 3 illustrates a quadword containing a BALR at address A, the Figure being useful in describing the operation of the Branch History Table of the invention.

In the following description it is assumed that the size of the block that is fetched from the cache is a quadword (16 bytes). For example, in IBM 370 and upward compatible architectures instruction lengths are multiples of halfwords (two bytes) and are aligned on halfword boundaries. In FIG. 3 an example is shown in which the BALR (a two byte or one half-word instruction) at address A fills the fourth halfword 42 of a quadword. As shown above, a quadword contains eight halfwords. In that quadwords are fetched the BHT 14 is organized on at least a quadword basis. That is, when the BCR at address D is taken to address A+2 the BHT 14 is searched using address A+2, but entries for all branches within the illustrated quadword are made available. In particular, the entry for the BALR at address A will be observed. The operation of the presently preferred embodiment of the invention is now described in detail.

In accordance with the invention, and as illustrated in FIG. 2b, each entry of the BHT 14 includes at least two additional fields. A first field is a CALL field that indicates that the entry corresponds to a potential calling branch (BALR). The CALL field may require two bits for expression in that some of the variations of the BALR are full-word instructions. In this case, two bits are used to indicate the instruction length. Optionally, entries for a branch can be stored according to the address of the last halfword of the branch instruction. If this latter approach is taken then the actual length of the branch instruction is irrelevant and the CALL field may be a single bit. A second field is a one bit PSEUDO field that is provided to indicate that the associated entry does not correspond to a branch. The role of the PSEUDO field of the BHT entry is described below.

Branch prediction is accomplished as described below.

The execution of the BALR instruction at address A (FIG. 1) causes a BHT entry to be created having BA=A, TA=C, and the CALL field asserted to indicate that the entry corresponds to a BALR. This BALR instruction may be a subroutine call, although whether or not the BALR instruction is a subroutine call is unknown at this point in the execution of instructions.

The execution of the BCR instruction at address D causes an entry to be created in the BHT 14 having BA=D and TA=A+2. In that the execution of the BCR instruction causes instruction fetching to be redirected to location A+2 the BHT is searched at address A+2 and the entry, created above in response to the execution of the BALR at address A, is found for address A. This entry has CALL asserted. In that the BALR is a potential call instruction, and the BCR is a potential return instruction, and since the BCR branches to the instruction immediately following the BALR, the BCR is positively identified as a subroutine return, and the BALR is positively identified as a subroutine call.

The recognition of the BCR as a subroutine return results in the creation of a PSEUDO entry. At the time of recognition, the following information is available: D, the address of the returning BCR, and C, the address of the entry point into the subroutine obtained from the TA field of the entry pertaining to the BALR at location A.

The PSEUDO entry is created for address C such that it will be recognized immediately upon entry into the subroutine. The PSEUDO entry is set to point to location D. Location D is the address of the BCR that will return from the subroutine. Thus, the PSEUDO entry that is stored in the BHT 14 has BA=C, TA=D, and the PSEUDO bit asserted to indicate that the entry does not represent a branch at location C that is taken to location D.

Eventually, when the BALR at location B is taken to location C the BHT 14 is searched and the PSEUDO entry that points to location D is found. At the time that the PSEUDO entry is found, the following information is available: D, that is the location of the returning BCR, and B+2, the return point available from an address autoincrementer of the instruction prefetch unit. B+2 is the address of the instruction following the BALR that triggered the BHT search.

This information is used to update the BHT. In particular, the entry for location D is found, and the content of the TA field is replaced with the address B+2.

That is, if a BHT 14 search done in response to a target address to a taken BAL or BALR reveals a PSEUDO entry, a BHT 14 update is performed. The update changes the target address of the entry specified in the TA field of the PSEUDO entry. The target address placed in the entry is the next sequential address to the BAL or BALR.

In the course of further instruction fetching the BHT 14 provides an entry for address D, the upcoming BCR. This entry has the TA field set to B+2. That is, the return is made to the correct target address and not to the historical target address.

Figure 4:
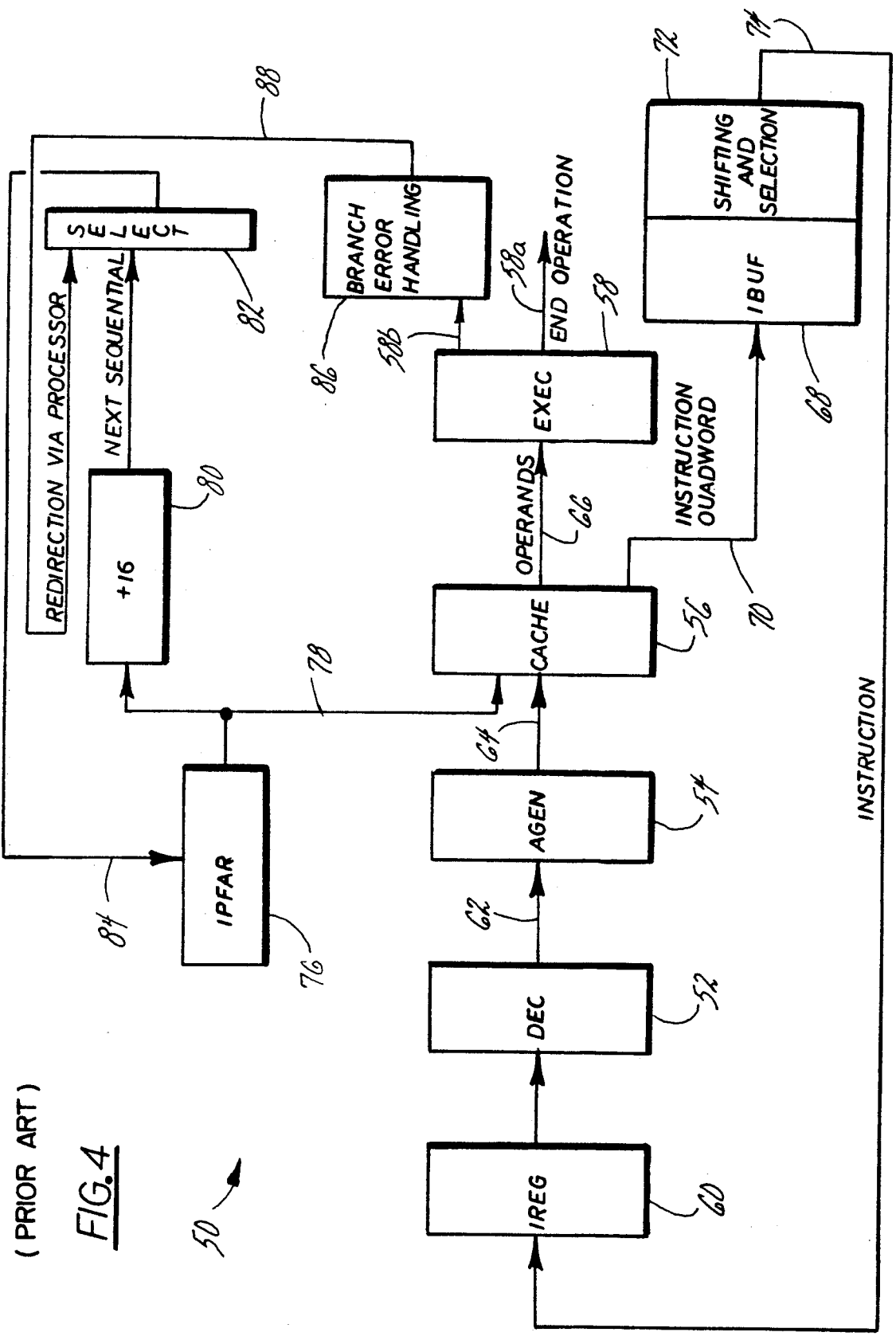
FIG. 4 is a block diagram showing a processor instruction pipeline.
Figure 5:
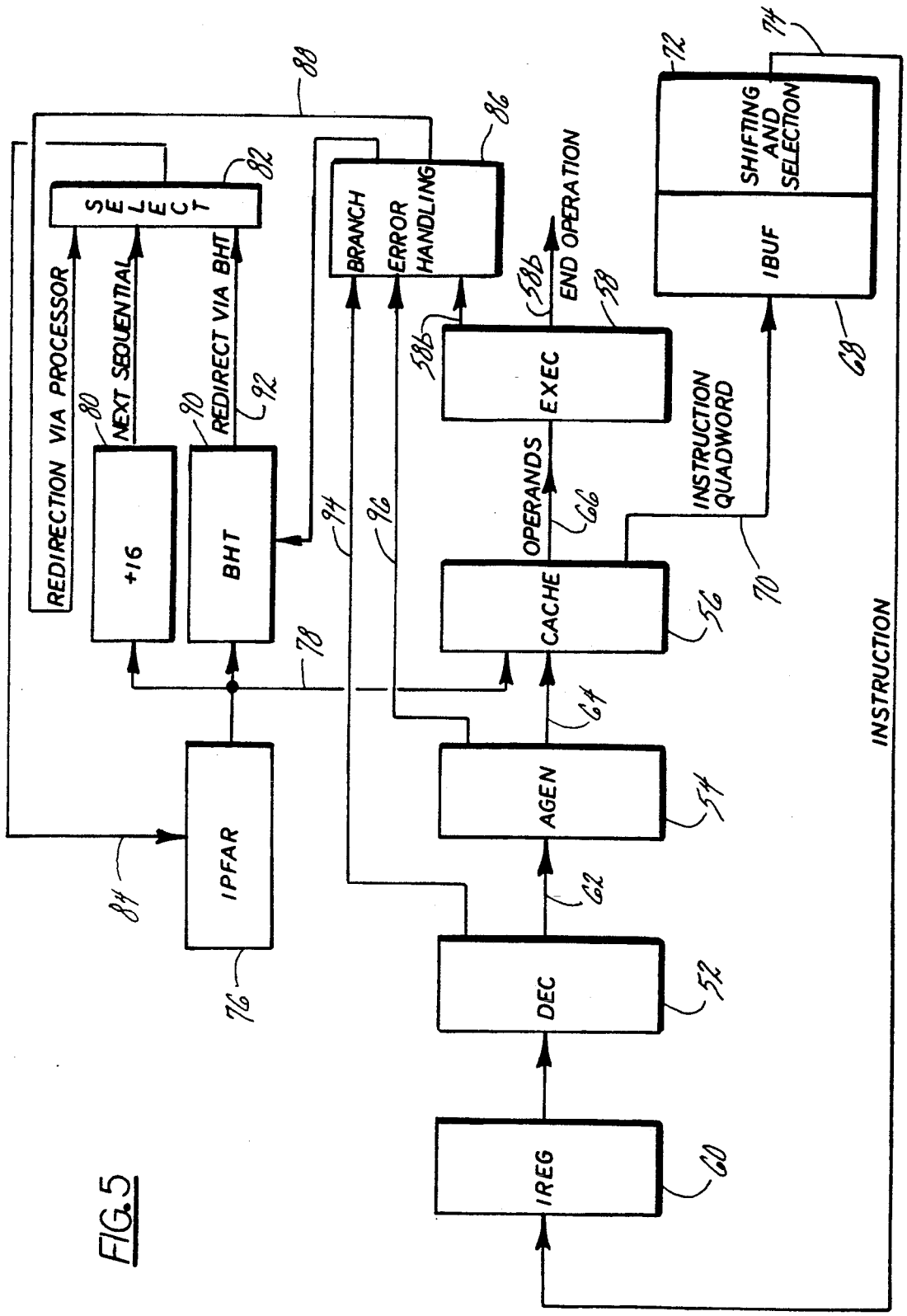
FIG. 5 is a block diagram showing a processor instruction pipeline including a Branch History Table.

As an aid in further understanding the operation of the invention reference is now made to FIG. 4 which shows a processor instruction pipeline without a BHT and to FIG. 5, which shows a processor instruction pipeline with a BHT 90.

First, reference is made to FIG. 4 and a nominal operation of the BHT-less embodiment is described. The pipeline comprises an Instruction Decoder 52, an Address Generation unit 54, a Cache 56, and an Execution Unit 58. An instruction that is to be processed is held in an Instruction Register 60 where the instruction is decoded by the Decoder 52. The Decoder 52 determines what type of instruction is held in Register 60 and reads the contents of the necessary general purpose registers (not shown) required to begin processing the instruction. If the instruction requires a memory operation, the contents of the aforementioned general purpose registers are sent to the Address Generation unit 54 on path 62 where they are combined to form a memory address. This address is then sent to the Cache 56 on path 64.

If the memory operation is an operand fetch the appropriate operand is sent to the Execution Unit 58 on path 66. If the instruction is a branch instruction, then the memory operation is an instruction fetch. In this case, the quadword containing the target instruction is fetched and sent to the Instruction Buffer 68 on path 70. If the branch instruction is found to be taken, then Shifting and Selection hardware 72 operates on the instruction quadword to extract the target instruction and send it to the Instruction Register 60 via path 74. Instruction decoding then begins down the branch target path. It is noted that memory store operations and the effect of a Cache miss are not discussed herein in that these events are not directly relevant to the subject invention.

After an instruction and the associated relevant operands arrive at the Execution Unit 58 the instruction is executed. If no exceptions occur during the execution of the instruction an ENDOP (END of Operation) signal 58a is generated, and the instruction is considered to be completed. Memory stores that may have been staged by the instruction are released by the ENDOP signal and redirection down a branch target path, if the instruction was a branch, is sanctioned if the Execution Unit 58 determines that the branch was taken.

The instruction pipeline comprises only those elements and paths discussed thus far. The elements of the pipeline operate in lock-step with respect to one another. Instruction prefetching and staging are embodied in the remaining blocks and are discussed below. Instruction prefetching is not formally considered part of the instruction pipeline in that prefetching runs autonomously with respect to the pipeline. That is, instruction prefetching operates as a free-running engine that attempts to run ahead of the Decoder 52 to keep the Instruction Buffer 68 full.

Once again, it is noted that instructions are aligned on halfword boundaries and are two, four or six bytes in length and that instructions per se are not fetched from the cache. Rather, quadwords containing instructions are fetched on quadword boundaries and are loaded into the Instruction Buffer 68. The Instruction Buffer 68 is merely a buffer for quadwords; the instructions have no "identity" when in the Instruction Buffer. It is the Decoder 52 that determines, from the current instruction length, the beginning halfword location of the next instruction and which further causes the Shifting and Selection logic 72 to properly select and align the next instruction for processing.

In the absence of taken branch instructions instruction prefetching is initiated by the Instruction PreFetch Address Register (IPFAR) 76. The IPFAR 76 contains the quadword address of the next quadword that is to be prefetched from the Cache 56 and loaded into the Instruction Buffer 68. This prefetch is done via paths 70 and 78. An Incrementer 80 adds a quadword offset to the quadword address in IPFAR 76 to obtain the next sequential quadword address. In the absence of a taken branch, the next-sequential quadword address is gated through a Selector 82 and onto path 84 where it replaces the current quadword address in IPFAR 76.

If a taken branch is encountered by the Execution Unit 58, then the canonical target fetch is already in progress along the paths 64, 70 and 74, but the autonomous instruction prefetching process must be redirected. The Branch Error Handling 86 accomplishes this redirection along path 88, through the Selector 82, down path 84 and into IPFAR 76.

Referring now to FIG. 5 there is described, in accordance with the invention, the operation of the instruction prefetching process with a Branch History Table (BHT) 90 included. As was stated the BHT 90 is a table of entries organized on a quadword basis, not on an instruction (halfword) basis, since it is quadwords of instructions that are prefetched.

When the quadword address in IPFAR 76 is used to prefetch an instruction quadword from the Cache 56 the address is also used to search the BHT 90 at the same time that the address is being incremented by Incrementer 80. The BHT 90 attempts to locate entries associated with taken branch instructions that lie within the quadword that is being prefetched. If such entries are found, and if it is determined that the branch instruction associated with one such entry will be subsequently encountered by the Decoder 52, then this event, referred to as a "BHT hit" is used to redirect the prefetching by gating the BHT 90 output 92 through the Selector 82 and into IPFAR 76. In this case, the BHT output 92 is the target address of the branch instruction associated with the entry.

The BHT Branch Address (BA) field is conceptually one entity but, in practical implementations, it is split into three portions. The low-order three bits specify the halfword offset within the instruction quadword. Since the BHT is searched by quadword address, these bits are not used directly by address comparators (not shown). However, in the event that redirection has been effected by either the processor (via line 58b through BEH 86, line 88, through Select 82 to line 84 to IPFAR 76), or by the BHT 90 (via line 92 through Select 86 to line 84 to IPFAR 76), the redirection is to a branch target (halfword) address. Therefore, the low-order three bits are needed within the BHT 90 entry to determine whether the halfword branch target address lies before the halfword offset of the branch address corresponding to the branch instruction in the target quadword. If not, then the branch instruction in the target quadword will not be encountered by the Decoder 52, and the entry does not constitute a BHT hit.

The BHT 90 is typically constructed as a set associative-table and, as such, some portion of the quadword address, typically the low order bits, are used to select the appropriate congruence class. Therefore, this portion of the quadword address is implicit for a given congruence class, and need not be stored within the BHT 90 entries.

That portion of the quadword address that is not used for congruence class selection must be stored as an address tag for each entry. Thus, the low-order bits of IPFAR 76 are used to select a congruence class within the BHT 90, and the high-order bits are compared to the address tags for all BHT 90 entries within the congruence class. Only those entries within that congruence class whose address tags match the high-order bits of IPFAR 76 correspond to branches within the quadword specified by IPFAR 76.

Having reviewed the function of the BA field, the BHT 90 further includes the target address (TA) field giving the (halfword) address of the branch target instruction. A valid bit is also employed to indicate that the entry is valid. The CALL and PSEUDO bit fields operate as previously described.

It is noted that since the BHT 120 is attempting to anticipate branches and redirect the prefetching prior to the time that the branches are actually encountered by the Decoder 52, that there are additional opportunities for misdirection to happen. Hence, more signal paths are required to correct for these misdirections. By example, if the BHT 90 indicates a taken branch, thereby causing redirection, but the Decoder 52 subsequently discovers that there is no branch instruction at the address indicated by the BHT 90, the instruction prefetch must be resumed along the original path. The signal path that corrects for this misdirection is indicated by line 94. Further by example, if it is discovered by the Address Generation unit 54 that the target address that was indicated by the BHT 90 is wrong, prefetching must be redirected to the correct target address. This path is indicated by line 96. It is this second type of BHT 90 error that the use of the invention minimizes.

Of course, unconditional branches that are unknown to the BHT 90 are detected in the Decoder 52. Also, conditional branches may or may not be resolved prior to the time that they are executed.

It is further noted that prefetching is redirected at the earliest possible time for unanticipated unconditional branches and also for incorrectly-guessed conditional branches. Since this is the case whether or not the processor is provided with a BHT 90 these paths are not shown explicitly. It is further noted that if it is discovered that the BHT 90 has made an error, the BHT 90 is updated at the time that instruction prefetching is redirected. This BHT update path is indicated by the line entering the BHT 90 from the Branch Error Handling block 86.

While the invention has been particularly shown and described with respect to a preferred embodiment thereof, it will be understood by those skilled in the art that changes in form and detail may be made therein without departing from the spirit and scope of the invention.

Having thus described our invention, what we claim as new, and desire to secure by Letters Patent is:

1. A method for operating a digital data processor to execute subroutine call functions and subroutine return functions, the digital data processor including an instruction prefetch means for prefetching blocks of data from memory means, a block of data including branch instructions of a first type that may implement a subroutine call function and branch instructions of a second type that may implement a subroutine return instruction, the instruction prefetch means including a Branch History Table having a plurality of entries, the method being executed by the digital data processor in accordance with the steps of:

storing a first entry within the Branch History Table in response to a decoding of a prefetched branch instruction of the first type, the first entry including a first field (BA) for storing an address (A) of the decoded branch instruction of the first type, a second field (TA) for storing a target address (C) of the decoded branch instruction of the first type, and a third field (CALL) for storing an indication that the decoded branch instruction is of the first type that may implement a subroutine call function;

storing a second entry within the Branch History Table in response to a decoding of a prefetched branch instruction of the second type that may implement a subroutine return function, the second entry including the first field (BA) for storing an address (D) of the decoded branch instruction of the second type, the second entry further including the second field (TA) for storing a target address (A+n) of the decoded branch instruction of the second type;

in response to the decoding of the branch instruction of the second type, performing a search of the first field (BA) of each of the entries of the Branch History Table to locate the first entry, the search using the address (A+n) to determine if the decoded branch instruction of the second type has a target address that points to a next instruction address after the address of the branch instruction of the first type;

in response to locating the first entry, and in response to determining that the located first entry has the stored indication in the third field, determining that the first entry corresponds to a subroutine call function and that the second entry corresponds to a subroutine return function for the subroutine call function; and storing a third entry within the Branch History Table, the third entry including the first field (BA) for storing the target address (C) of the first entry, the third entry further including the second field (TA) for storing the address (D) of the decoded branch instruction of the second type, the third entry further including a fourth field (PSEUDO) for storing an indication that, for the third entry, the address (C) is an entry point into a subroutine that is called by the decoded branch instruction of the first type, and that the address (D) stores a branch instruction of the second type that implements a return from subroutine instruction for the subroutine that is called by the decoded branch instruction of the first type;

said method further including the steps of, in response to a decoding of a second branch instruction of the first type, the second branch instruction being located at an address (B) and having a target address equal to the address (C);

searching the entries of the Branch History Table to locate a PSEUDO entry having a BA field equal to the address (C);

locating the third entry within the Branch History Table;

using the content (D) of the TA field of the third entry to search the Branch History Table for an entry having the BA field equal to (D);

in response to the search, locating the second entry within the Branch History Table;

updating the TA field of the second entry with an address equal to (B+n); and upon a next occurrence of the execution of the branch instruction of the second type that is located at the address (D), the content of the (TA) field of the second entry is output by the Branch History Table to cause a return from the subroutine to the address (B+n).

2. A method as set forth in claim 1 wherein the branch instruction of the first type includes a Branch and Link (BAL) instruction and a Branch and Link Register (BALR) instruction, wherein the branch instruction of the second type includes a Branch on Condition to Register (BCR) instruction, and wherein n is equal to two.

3. A Branch History Table for sue in a digital data processor that includes instruction prefetch means for prefetching a block of data that is comprised of a plurality of instructions that are consecutively stored within a memory, said instruction prefetch means including means for generating memory addresses from which blocks of data are prefetched, said Branch History Table being comprised of data storage means having a plurality of locations for storing a plurality of entries, each of said entries including a first field (BA) that stores information identifying a memory address at which a previously taken branch instruction is stored, each of said entries further including a second field (TA) for storing information identifying a target address of the previously taken branch instruction, said data storage means having an input for receiving a prefetch memory address from said memory address generating means, the prefetch memory address identifying an initial address of a block of data to be prefetched, said data storage means being responsive to the prefetch memory address for identifying an entry having a field that corresponds to an address of an instruction within the block of data to be prefetched, said Branch History Table further having an output coupled to said memory address generating means, said output providing an initial address of a next block to be prefetched for causing said memory address generating means to redirect the prefetching of a next block of data, the initial address of the next block to be prefetched being provided from the TA field of an identified entry, wherein each of said entries further includes a third field (CALL) for storing data that identifies, when present, the associated taken branch instruction as being a branch instruction of a first type that may implement a subroutine call instruction, wherein each of said entries further includes a fourth field )PSEUDO) for storing an indication that identifies, when present, the entry as being an entry type wherein the first field stores an entry point address of a first instruction of a subroutine and wherein the second field stores an address of a second type of branch instruction that implements a return from subroutine instruction for the subroutine; and wherein said instruction prefetch means includes means, responsive to a decoding of a second branch instruction of the first type and also responsive to the information stored within an entry that has an asserted PSEUDO field indication, for updating the TA field of the stored second entry such that said Branch History Table outputs a memory address to said memory address generating means to cause a return from subroutine to a next consecutive instruction address after the address of the second branch instruction of the first type.

4. A Branch History Table as set forth in claim 3 wherein the branch instruction of the first type includes a Branch and Link (BAL) instruction and a Branch and Link Register (BALR) instruction, and wherein the branch instruction of the second type includes a Branch on Condition to Register (BCR) instruction.

5. A Branch History Table as set forth in claim 3 wherein a prefetched block of data begins at a quad-word memory address boundary.

* * * * *